US010501587B2

(12) United States Patent
Kanmukhla (10) Patent No.: US 10,501,587 B2
(45) Date of Patent: Dec. 10, 2019

(54) PROCESSES FOR PRODUCING AN ANTIMICROBIAL MASTERBATCH AND PRODUCTS THEREOF

(71) Applicant: Cupron Inc., Richmond, VA (US)

(72) Inventor: Vikram Kanmukhla, Henrico, VA (US)

(73) Assignee: Cupron, Inc., Richmond, VA (US)

( * ) Notice: Subject to any disclaimer, the term of this patent is extended or adjusted under 35 U.S.C. 154(b) by 481 days.

(21) Appl. No.: 15/213,589

(22) Filed: Jul. 19, 2016

(65) Prior Publication Data

US 2018/0022879 A1    Jan. 25, 2018

(51) Int. Cl.
*B29B 13/02* (2006.01)
*D01D 1/04* (2006.01)
(Continued)

(52) U.S. Cl.
CPC ............... *C08J 3/22* (2013.01); *B29B 9/065* (2013.01); *B29C 48/022* (2019.02); *B29C 48/04* (2019.02);
(Continued)

(58) Field of Classification Search
CPC ........... B29B 9/06; B29B 9/065; B29B 13/02; B29K 2067/00; B29K 2067/003; B29K 2067/006; B29K 2067/04; B29K 2067/043; B29K 2067/046; B29K 2075/00; B29K 2077/00; B29K 2505/10; B29K 2505/14;
(Continued)

(56) References Cited

U.S. PATENT DOCUMENTS 4,171,424 A    10/1979    Habermeier et al.
2009/0241504 A1  10/2009    Liu
(Continued)

FOREIGN PATENT DOCUMENTS

CN       1800454 A    7/2006
CN     103741242 A    4/2014
(Continued)

OTHER PUBLICATIONS

Written Opinion of the International Searching Authority completed on Nov. 16, 2016 and dated Dec. 20, 2016.

*Primary Examiner* — Leo B Tentoni
(74) *Attorney, Agent, or Firm* — Bernard G. Pike; PikeIPLaw, PLLC (57) ABSTRACT

A masterbatch may be blended with virgin polymer to add desired color or other properties to the virgin polymer prior to further processing. Methods and processes for producing an antimicrobial and/or antiviral polymeric masterbatch that may be used to add antimicrobial, antiviral and/or antifungal properties to a virgin polymer without significantly degrading the properties of the virgin polymer. The masterbatch may be extruded into pellets or formed into other particles for subsequent blending with the virgin polymer to add antimicrobial and antiviral properties to the polymeric materials. The method includes a heat treatment after compounding the base polymer with the antimicrobial, antiviral and/or antifungal are compounded together. The heat treatment comprises heating the masterbatch blend to a temperature between the glass transition temperature and the melting point of the base polymer.

23 Claims, 3 Drawing Sheets

(51) Int. Cl.
| | |
|---|---|
| *D01D 5/08* | (2006.01) |
| *D01F 1/02* | (2006.01) |
| *D01F 1/10* | (2006.01) |
| *D01F 6/60* | (2006.01) |
| *D01F 6/70* | (2006.01) |
| *C08J 3/22* | (2006.01) |
| *B29C 48/05* | (2019.01) |
| *B29C 48/00* | (2019.01) |
| *B29B 9/06* | (2006.01) |
| *D01F 6/84* | (2006.01) |
| *B29C 48/04* | (2019.01) |
| *B29K 67/00* | (2006.01) |
| *B29K 505/14* | (2006.01) |
| *B29K 77/00* | (2006.01) |
| *B29K 75/00* | (2006.01) |
| *B29K 33/04* | (2006.01) |
| *B29K 505/10* | (2006.01) |
| *D01F 6/62* | (2006.01) |

(52) U.S. Cl.
CPC ............. *B29C 48/05* (2019.02); *C08J 3/226* (2013.01); *D01F 1/103* (2013.01); *D01F 6/84* (2013.01); *B29B 9/06* (2013.01); *B29K 2033/04* (2013.01); *B29K 2067/00* (2013.01); *B29K 2067/003* (2013.01); *B29K 2067/006* (2013.01); *B29K 2067/04* (2013.01); *B29K 2067/043* (2013.01); *B29K 2067/046* (2013.01); *B29K 2075/00* (2013.01); *B29K 2077/00* (2013.01); *B29K 2505/10* (2013.01); *B29K 2505/14* (2013.01); *C08J 2367/02* (2013.01); *C08J 2467/02* (2013.01); *D01F 6/62* (2013.01); *D10B 2401/13* (2013.01)

(58) Field of Classification Search
CPC .... C08J 3/22; C08J 3/226; D01D 1/04; D01D 5/08; D01F 1/02; D01F 1/10; D01F 1/103; D01F 6/60; D01F 6/62; D01F 6/70; D10B 2401/13
USPC .......................................... 264/211; 523/122
See application file for complete search history.

(56) References Cited

U.S. PATENT DOCUMENTS

| | | |
|---|---|---|
| 2010/0113626 A1 | 5/2010 | Liu |
| 2013/0059941 A1 | 3/2013 | Craig et al. |
| 2015/0044449 A1 | 2/2015 | Foss et al. |
| 2015/0218321 A1 | 8/2015 | Gabbay |

FOREIGN PATENT DOCUMENTS

| | | | |
|---|---|---|---|
| CN | 103981591 B | 1/2016 | |
| EP | 2468819 A1 | 6/2012 | |
| JP | 2002275258 A * | 9/2002 | ................ C08J 3/20 |
| WO | 03010225 A1 | 2/2003 | |
| WO | 2009072144 A2 | 6/2009 | |

* cited by examiner

PROCESSES FOR PRODUCING AN ANTIMICROBIAL MASTERBATCH AND PRODUCTS THEREOF

FIELD OF THE INVENTION

The present invention relates to methods and processes for producing an antimicrobial and/or antiviral polymeric masterbatch. The masterbatch may be extruded into pellets formed into other particles for subsequent blending with polymers to add antimicrobial and antiviral properties to the polymeric materials.

Antimicrobial and/or antiviral masterbatch allows a polymeric product producer to add antimicrobial and/or antiviral components economically to polymers during the manufacturing process. More particularly, the present invention relates to an improved process and masterbatch for preparing antimicrobial and antiviral polymeric materials having a multitude of antimicrobial uses.

BACKGROUND

Polymeric materials comprising a small concentration of particles of water insoluble copper compounds that release at least one of Cu+ ions and Cu++ ions upon contact with a fluid are that embedded and/or protruding from the surface of the polymeric materials exhibit antimicrobial, antiviral and/or antifungal properties. Thus, such polymeric materials may be converted into products having antimicrobial, antiviral and/or antifungal properties including, but not limited to, fibers, yarns, films and solid surfaces through extrusion, spray, or molding processes, for example.

In certain embodiments, the antimicrobial or fire retardant particles may be added to a melted polymer to form a polymeric slurry. The antimicrobial, antifungal, and/or antiviral component may be added directly to the polymer or added as a component of an antimicrobial and/or antiviral masterbatch.

United States Patent Application Publication No. US 2008/0193496 describes a process to produce an antimicrobial and antiviral masterbatch and processes for producing anti-microbial and antiviral products, and its disclosure is hereby incorporated by reference in its entirety.

Figure 1:
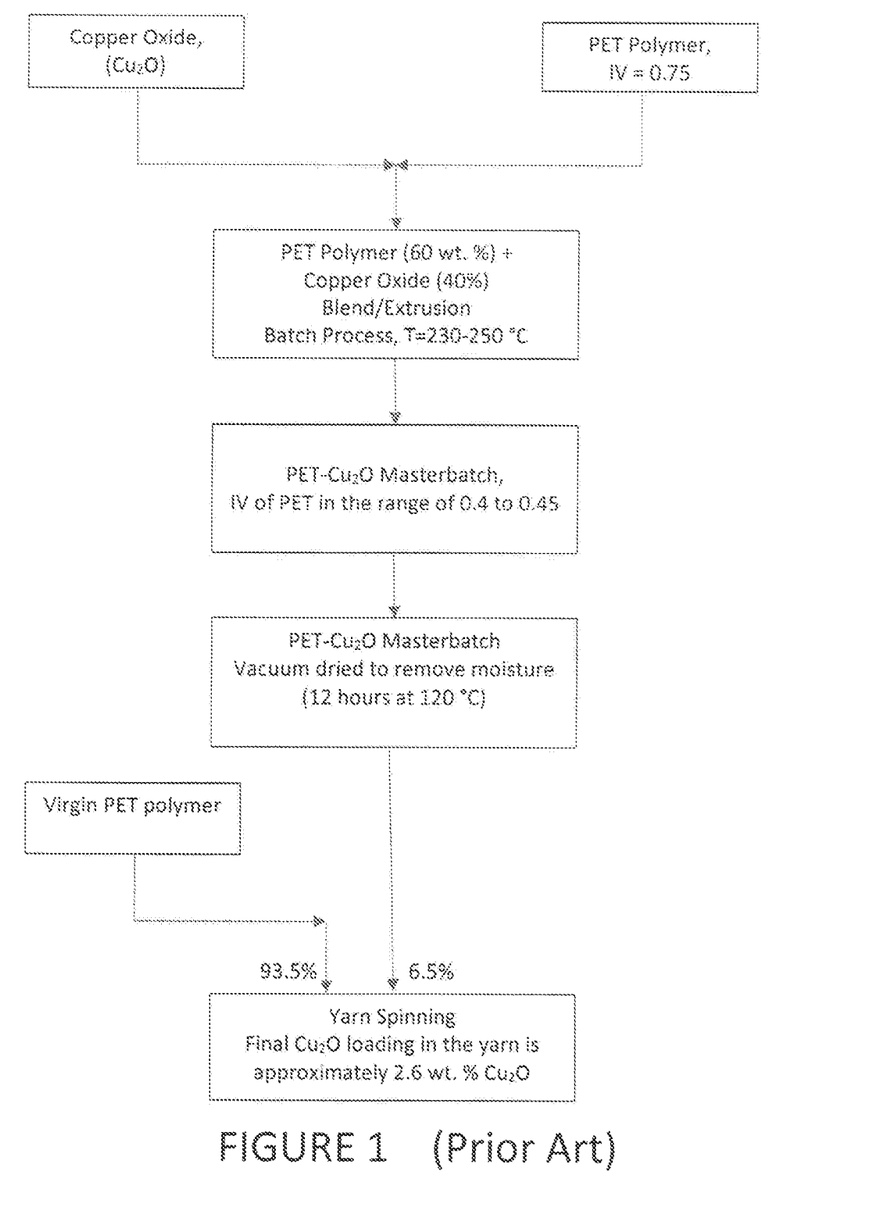
FIG. 1 depicts a prior art process for the production of antimicrobial polymeric fibers, wherein a PET-$Cu_2O$ masterbatch pellets are dried after blending and extrusion to remove residual moisture prior to blending with virgin polymer to produce an antimicrobial polymeric material with a $Cu_2O$ concentration of approximately 2.6 wt. %.

A prior art process for making antimicrobial and antiviral masterbatch is shown in FIG. 1. The process includes compounding water-insoluble copper oxide particles with a polyethylene phthalate (PET). In the embodiment shown in FIG. 1, the PET has an IV of 0.75. The PET is compounded with copper oxide particles in a batch process at a temperature between 230° C. to 250° C., and Irgafos®, a phosphite-based stabilizer was added to the compounding process to scavenge the moisture and prevent hydrolysis and degradation of the PET. The slurry was extruded to produce antimicrobial masterbatch pellets that may be blended with other virgin polymers to produce antimicrobial and antiviral polymeric materials. In a typical process, the blended masterbatch has a copper oxide particle concentration of approximately 40 wt. %. In an attempt to prevent degradation of the blended virgin polymer based upon conventional processing knowledge, the blended masterbatch is vacuum dried to remove moisture from the pellets for 12 hours at approximately 120° C.

As previously stated, the masterbatch pellets have a copper oxide concentration of approximately 40 wt. %. These pellets may be blended with a virgin thermoplastic polymer to produce the antimicrobial polymeric materials. For example, the masterbatch pellets may be added to the virgin thermoplastic polymer at a let-down ratio of 6.5% to produce an antimicrobial polymeric material having a concentration of approximately 2.6 wt. % of copper oxide and then extruded into a yarn. However, in this embodiment, during the process of extruding of the yarn, the polymer did not form stable thread lines and was dripping through the spinneret holes. This phenomenon is indicative of IV loss of polymer due to hydrolysis. The yarn yield was <10%.

In such processes, the yield of the spinning process is calculated by dividing the weight of fiber or yarn produced divided by the weight of thermoplastic processed through the spinning process.

There is a need for a process for producing an antimicrobial masterbatch and a spinning process that produces a higher yield of antimicrobial polymeric yarns or fibers.

SUMMARY

A masterbatch may be blended with a virgin polymer to provide certain properties to the polymer. For example, the masterbatch may be an antimicrobial masterbatch for providing antimicrobial properties to the polymer or a fire retardant masterbatch for providing fire retardant properties to the polymer. In most cases, adding the masterbatch to the polymer should not adversely affect the other properties of the polymer.

In one embodiment, a method of producing an antimicrobial masterbatch that does not adversely affect the viscosity of a blended polymer comprises compounding antimicrobial particles with a base polymer. For example, the antimicrobial particles of the masterbatch may comprise an attached functionality that may react with a blended virgin polymer to adversely affect the polymer's molecular weight or viscosity.

A masterbatch may be produced by compounding a base polymer and at least one component that includes the desired properties, in an embodiment of an antimicrobial masterbatch the antimicrobial particles may be added to a base polymer in a ratio between 1 to 7 and 1 to 1, for example, to produce an antimicrobial polymer or an antimicrobial masterbatch. In another embodiment of an antimicrobial masterbatch the antimicrobial particles may be added to a base polymer in a ratio between 1 to 3 and 1 to 1, for example, to produce an antimicrobial polymer or an antimicrobial masterbatch with a higher concentration of antimicrobial particles. The antimicrobial polymer or antimicrobial masterbatch may comprise antimicrobial particles in a concentration from 12 wt. % to 50 wt. %.

In some cases, the antimicrobial particles may comprise components or functionality that may react with the virgin polymer. Additional processing steps may be added to remove the components or functionality from components of the masterbatch. For example, after compounding, the antimicrobial polymer may be heated to react the polymer in the antimicrobial polymer with functional groups such as hydroxyl groups attached to the antimicrobial particles. The antimicrobial polymer may be heated to a reaction temperature between the glass transition temperature and the melting temperature of the polymer in the antimicrobial polymer to produce an antimicrobial masterbatch, for example. In some cases, the heating may additionally result in an increase in the intrinsic viscosity of the polymer in the antimicrobial polymer.

The method for producing an antimicrobial polymer may comprise blending the antimicrobial masterbatch with a thermoplastic polymer. The let-down ratio may be any desired let-down ratio to produce the desired concentration of antimicrobial particles in the finished polymer. For example, a let-down ratio between 3% and 10% may be used to produce an antimicrobial polymer. The antimicrobial polymer may be extruded to produce an antimicrobial fiber.

The yield of extruding the antimicrobial polymer is greater than 80%. The yield is calculated by the weight of the antimicrobial fiber produced divided by the weight of the antimicrobial polymer that was extruded.

In certain embodiments, the base polymer is one of a polyester, polyethylene terephthalate, polybutylene terephthalate, and polytrimethylene terephthalate, polylactic acid, polyglycolide, and polylactic-co-glycolic acid, polyamides or nylon including, but not limited to, nylon-6 (polycaprolactum) and Nylon 6.6, polyurethanes, similar thermoplastic polymers or copolymers, and combinations thereof.

Therefore, in one embodiment, a method of forming an antimicrobial fiber may comprise compounding water-insoluble copper compound particles with a polyester polymer wherein the ratio of antimicrobial metal particles to polyester polymer is between 1 to 3 and 1 to 1 to produce an antimicrobial polyester, wherein the water insoluble copper compound particles have hydroxyl groups attached to a surface of the insoluble copper compound particles. After compounding, the antimicrobial polyester may be heated to react the polyester polymer in the antimicrobial polymer with the hydroxyl groups attached to the surface of the insoluble copper compound particles to a reaction temperature between the glass transition temperature and the melting temperature of the polyester polymer in the antimicrobial polymer and polymerize the polyester polymer in the antimicrobial polyester to produce an antimicrobial masterbatch.

The antimicrobial particles may be water-insoluble copper compound particles. The water-insoluble copper compound particles may be exposed and protruding from surfaces of the polymeric material, wherein the water-insoluble copper oxide particles release at least one of Cu+ ions and Cu++ ions upon contact with a fluid.

The reaction temperature may be any temperature that drives the reaction. For example, the reaction temperature may be between the glass transition temperature and the melting point of the base polymer. In more specific embodiments, the reaction temperature is from 100° C. below the melting temperature to a temperature 10° C. below the melting temperature of the polymer in the antimicrobial polymer and, more specifically, the reaction temperature is from 60° C., below the melting temperature to a temperature 20° C. below the melting temperature of the polymer in the antimicrobial polymer.

BRIEF DESCRIPTION OF THE DRAWINGS

FIG. 3 depicts another embodiment of the inventive process for the production of antimicrobial polymeric fibers, wherein a PET polymer is blended with $Cu_2O$ particles to produce the antimicrobial masterbatch, the PET-$Cu_2O$ masterbatch is then subject to a polymerization process at a temperature between the glass transition temperature and the melting point of the masterbatch, this polymerization step is theorized to cause reaction of the PET with hydroxyl groups on the surface of the $Cu_2O$ particles, the masterbatch is then extruded to produce masterbatch pellets which are then dried to remove residual moisture prior to blending with virgin polymer to produce an antimicrobial polymeric material with a $Cu_2O$ concentration of approximately 2.6 wt. %; the antimicrobial polymeric material is then spun to form fibers or yarns with an increased yield of greater than 80%.

DESCRIPTION

Antimicrobial masterbatch pellets may be blended with a virgin polymer to add antimicrobial properties to the polymer. As used herein, antimicrobial masterbatch is a concentrated mixture of antimicrobial, antifungal, and/or antiviral polymeric pellets or other particles. The antimicrobial masterbatch may comprise additional components such as, but not limited to, pigments, processing agents, and/or other additives to be encapsulated in the polymer during a blending process. In one embodiment, antimicrobial masterbatch pellets may comprise a polyester polymer and particles comprising insoluble copper compounds that release Cu++ when exposed to a fluid as the active antimicrobial agent. In another embodiment, the antimicrobial masterbatch pellets may comprise a polyester polymer and particles consisting of insoluble copper compounds that release Cu++ when exposed to a fluid as the active antimicrobial agent, for example, copper oxides. In another embodiment, the method comprises adding a fire retardant particle to the base polymer to produce a fire retardant masterbatch.

The antimicrobial particle may comprise any antimicrobial solid having attached hydroxyl groups that may react with a polymer during a blending, extruding, polymerizing, and/or spinning process to lower the intrinsic viscosity of the polymer. The antimicrobial particle may include, but are not limited to, copper oxide, cuprous oxide, cupric oxide, copper iodide, zinc oxide (ZnO), silver oxide ($Ag_2O$), sodium aluminum silicates (zeolites), copper/silver/zinc/Cu—Ag/ Cu—Zn/Ag—Zn/Cu—Ag—Zn zeolites copper/silver/zinc/ Cu—Ag/Cu—Zn/Ag—Zn/Cu—Ag—Zn zeolites in combination with copper oxides, magnesium oxide in combination with copper oxide, silica ($SiO_2$), alumina ($Al_2N$, titanic ($TiO_2$) or combinations thereof. In another embodiment, the particle may be a fire retardant particle for producing a fire retardant masterbatch. The antimicrobial particles may be water-insoluble copper compound particles. The water-insoluble copper oxide particles release at least one of Cu+ ions and Cu++ ions upon contact with a fluid. The fire retardant particle may comprise magnesium oxide, for example.

In some embodiments, the antimicrobial particle consists of insoluble copper compound that release Cu+ and/or Cu++ when exposed to a fluid. In a specific embodiment, the antimicrobial particle consists of copper iodide, copper oxides, or combinations thereof.

The particles comprising insoluble copper compounds that release Cu+ and/or Cu++ when exposed to a fluid may be in a concentration of between 20 wt. % and 50 wt. % the masterbatch pellets. Typically, as seen in the prior art process of FIG. 1, masterbatch pellets are thoroughly dried to remove water, in the prior art process of FIG. 1, the masterbatch pellets are dried at 120° C. for 12 hours to remove residual moisture from the masterbatch pellet preparation process. Residual moisture is removed to prevent hydrolysis of the virgin polymers subsequently blended with the masterbatch to produce an antimicrobial polymer. Hydrolysis of the virgin polymer results in loss of IV and reduction of yield in extrusion and spinning processes. However, surprisingly the drying process of the prior art process was insufficient to prevent hydrolysis of the virgin polymer and reduction of intrinsic viscosity during blending of the masterbatch with the virgin polymer. The subsequent extrusion or spinning process resulted in a low yield.

The polymers may be a polyester including but, not limited to, polyethylene terephthalate (PET), polybutylene terephthalate (PET), and polytrimethylene terephthalate, polylactic acid (PLA), polyglycolide (PGA) and polylactic-co-glycolic acid (PGA), polyamides nylon including, but not limited to, nylon-6 (polycaprolactum) and Nylon 66, polyurethanes, similar thermoplastic polymers or copolymers, and combinations thereof. Polyesters are polymers formed from a dicarboxylic acid and a diol. The final polymer may be extruded to produce fibers, yarns or sheets which possess antimicrobial, antifungal and/or antiviral properties.

For example, in the process shown in FIG. 1, masterbatch pellets are prepared from polyethylene terephthalate (PET) with IV of 0.75. The intrinsic viscosity (hereinafter "IV") is a measure of the solute's contribution to the viscosity of a polymer solution and, thus, is an indirect measure of polymers molecular weight. Hydrolysis of the polymer may result in a reduction of the molecular weight and thus it's intrinsic viscosity.

In the process of FIG. 1, as the polyester is compounded with cuprous oxide, the polyester's molecular weight decreases which is indirectly measured by decrease in IV. The typical cause of loss of molecular weight and IV was always attributed to the presence of moisture in or generated during the compounding process. During compounding, which is typically performed in a batch process at a temperature between 230° C.-250° C., any moisture present has the opportunity to react with the base polymer, in this case a polyester, causing hydrolysis as given below:

R—COO—C$_6$H$_4$—COO—CH$_2$—CH$_2$—O—R'+ H$_2$O→R—COO—C$_6$H$_4$—COOH+HO—CH$_2$—O—R'     Equation (1)

It was previously known that cuprous oxide particles, even in dried form, naturally carry some moisture on the surface of the particles. To overcome the issue of IV loss due to hydrolysis, compounding processes have been conducted in the presence of stabilizing agents to scavenge the moisture in the masterbatch compounding. Typical stabilizing agents are phosphites, for example trialkyl phosphites, that may scavenge the moisture as given by below equation:

(RO)$_3$+H2O→(RO)$_2$P—OH+ROH     Equation (2)

Figure 2:
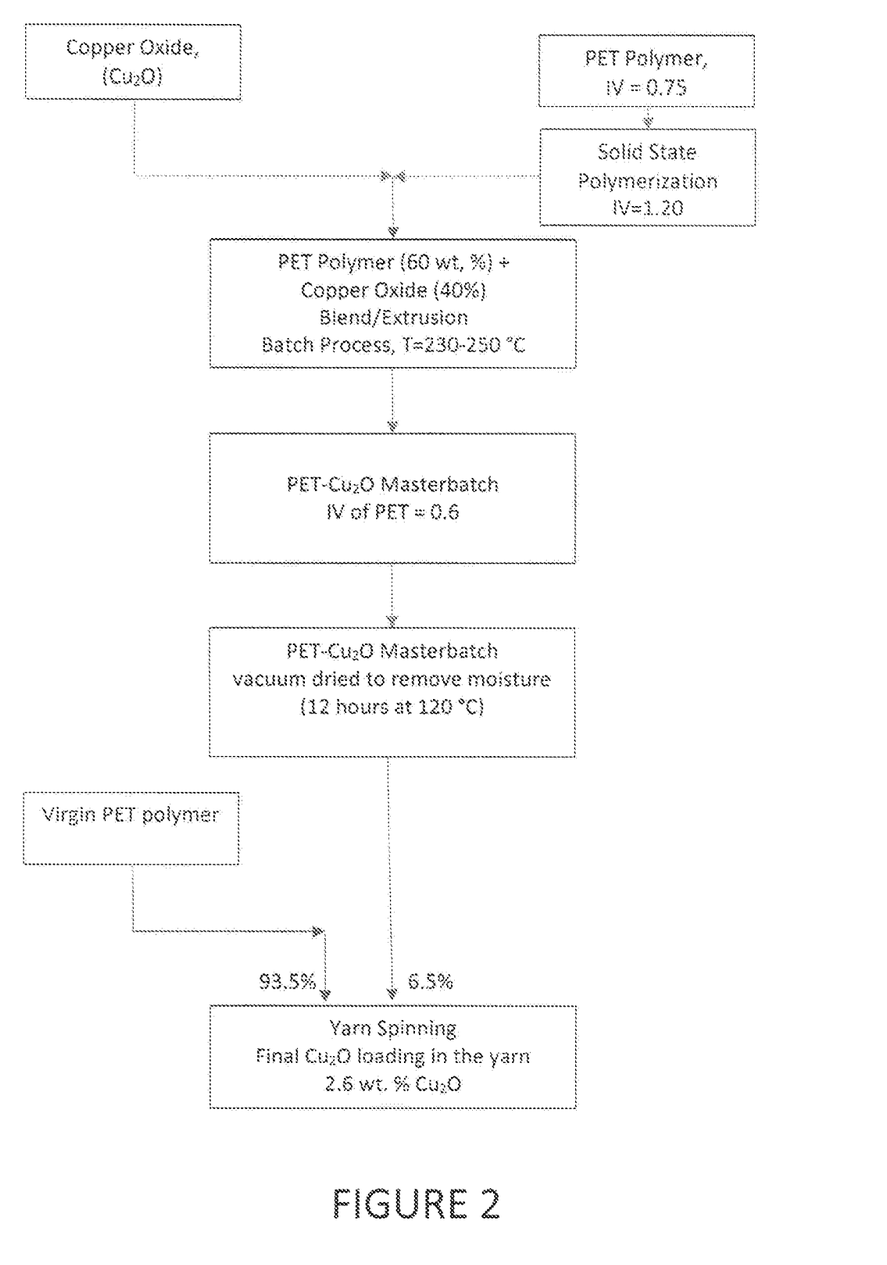
FIG. 2 depicts an inventive process for the production of antimicrobial polymeric fibers, wherein a PET polymer is solid state polymerized prior to blending with the $Cu_2O$ particles to increase the IV of the PET polymer prior to blending with the $Cu_2O$ particles, the PET with the increase IV is then blended with the $Cu_2O$ particles to produce PET-$Cu_2O$ masterbatch pellets, the master batch pellets are then dried after blending and extrusion to remove residual moisture prior to blending with virgin polymer to produce an antimicrobial polymeric material with a $Cu_2O$ concentration of approximately 2.6 wt. %.

Based upon this theory, a process (as shown in FIG. 2) was developed to reduce the concentration of water on the antimicrobial particle and, simultaneously, increase the molecular weight and IV of the masterbatch. If the moisture was removed in the masterbatch and the IV of the polyester was increased in the masterbatch, it was hypothesized that the IV of the polymeric material produced by the blending of virgin polymer with the masterbatch would also have a greater IV and a higher yield in the extrusion and/or spinning process. The PET was subjected to a polymerization process between the glass transition temperature and the melting point of the PET to increase the IV of the PET polymer in the masterbatch slurry and, thus in the final blended product that would be used in the extrusion and/or spinning process to form a yarn or fiber. The addition of the solid state polymerization process did increase the IV of the PET prior to compounding but ultimately did not increase the yield of the yarn spinning process.

The inventors surprisingly discovered that in addition to moisture the cuprous oxide particles additionally comprise hydroxyl groups attached to the surface of the cuprous oxide particles and that the carboxylic group present as end groups on the polyester chain may react with these hydroxyl groups present on cuprous oxide as given below:

R—COOH+CuOH→R—COO—Cu+H$_2$O     Equation (3)

Such a reaction produces additional water. The water generated by the reaction of the carboxyl groups with the hydroxyl groups attached to the surface of the particles may then degrade the polymer according to the reaction shown in Equation 2. This reaction with the generated moisture will reduce the molecular weight of the virgin polymer blended with the masterbatch and its IV, thus reducing the yield of the ultimate polymer in the spinning process.

In the example shown in FIG. 2. PET polymer having an IV of 0.75 was subject a solid state polymerization process to increase the IV to 1.2 prior to compounding with the copper oxide particles in a ratio of 60:40 PET polymer to copper oxide particles. The solid state polymerization was conducted to compensate for the subsequent IV loss during virgin polymer blending. A commercial grade cuprous oxide powder, at 40 wt. %, was compounded with polyester (IV=0.75). Irgafos®, a phosphite-based stabilizer was added to the masterbatch to help scavenge the moisture. The PET in the masterbatch by this method had an improved IV of 0.6. Subsequently, the masterbatch was used at a let-down ratio (LDR) of 6.5% to obtain a synthetic yarn with final cuprous oxide loading of 2.6 wt. %. During the extrusion of the yarn, the polymer was unable to form stable thread line and was dripping through the spinneret holes. This phenomenon is indicative of IV loss of polymer due to hydrolysis. The yarn yield was <10%.

The inventors discovered that due to the inherent moisture and hydroxyl groups present on cuprous oxide, there is some degree of hydrolysis during compounding/master-batching cuprous oxide with polyester. Due to this hydrolysis, the IV drops, generally from approximately 0.75 to 0.40-0.45 range. In this range, the blended masterbatch and virgin polymer produce a low yield in the subsequent spinning.

The inventors surprisingly found that heating the antimicrobial polymer after compounding with antimicrobial particles to a temperature between the glass transition temperature and the melting, point of the polymer removes the hydroxyl groups from the particles as described above and increases the IV of the polymer in the masterbatch. Then after removal of the hydroxyl groups and removal of moisture formed by the reaction with the hydroxyl groups during solid state polymerization, the masterbatch could successfully be blended with virgin polymer and extruded at high yield without reduction of the IV of the virgin polymer. Such processing of the compounded masterbatch with the high levels of antimicrobial particles was not expected to produce such results for the downstream processing.

Solid state polymerization or solid stating is a process used on polymers to increase the molecular weight to improve the tenacity and other physical properties of the base polymer. For example, solid state polymerization can be performed on polymers as a means to improve their molecular weight. The polymer is heated under inert atmosphere (for example, nitrogen gas) and vacuum, to temperatures above glass transition ($T_g$) but below the melting point of polymer ($T_m$) where the polymeric end groups/chains react with each other forming a higher molecular weight chain and water as by-product as given in the equations (4) and (5). The water generated during the process is removed by the high temperature and vacuum. The typical reactions proceed as given below:

R—COO—C$_6$H$_4$—COOH+HOOC—C$_6$H$_4$—COO—R'→R—COO—C$_6$H$_4$—COO—OC—C$_6$H$_4$—COO—R'+H$_2$O  Equation (4)

R—COO—C$_6$H$_4$—COOH+HO—CH$_2$—CH$_2$—O—R'→R—COO—C$_6$H$_4$—COO—CH$_2$—CH$_2$—O—R'+H$_2$O  Equation (5)

The temperature of the process to remove the hydroxyl groups from the antimicrobial or fire retardant particles may be a temperature between the glass transition temperature of the polymer or polymer blend to the melting temperature of the polymer or the polymer blend comprising the particles. In another embodiment, the process to remove the hydroxyl groups from the antimicrobial or fire retardant particles may be performed at a temperature between 100° C. below the melting temperature of the polymer or polymer blend to the melting temperature of the polymer or the polymer blend comprising the particles. In still another embodiment, the process to remove the hydroxyl groups from the antimicrobial or fire retardant particles may be performed at a temperature between 100° C. below the melting temperature of the polymer or polymer blend to a temperature 10° C. below the melting temperature of the polymer or the polymer blend comprising the particles. In yet another embodiment, the process to remove the hydroxyl groups from the antimicrobial or fire retardant particles may be performed at a temperature between 60° C. below the melting temperature of the polymer or polymer blend to a temperature 20° C. below the melting temperature of the polymer or the polymer blend comprising the particles.

Figure 3:
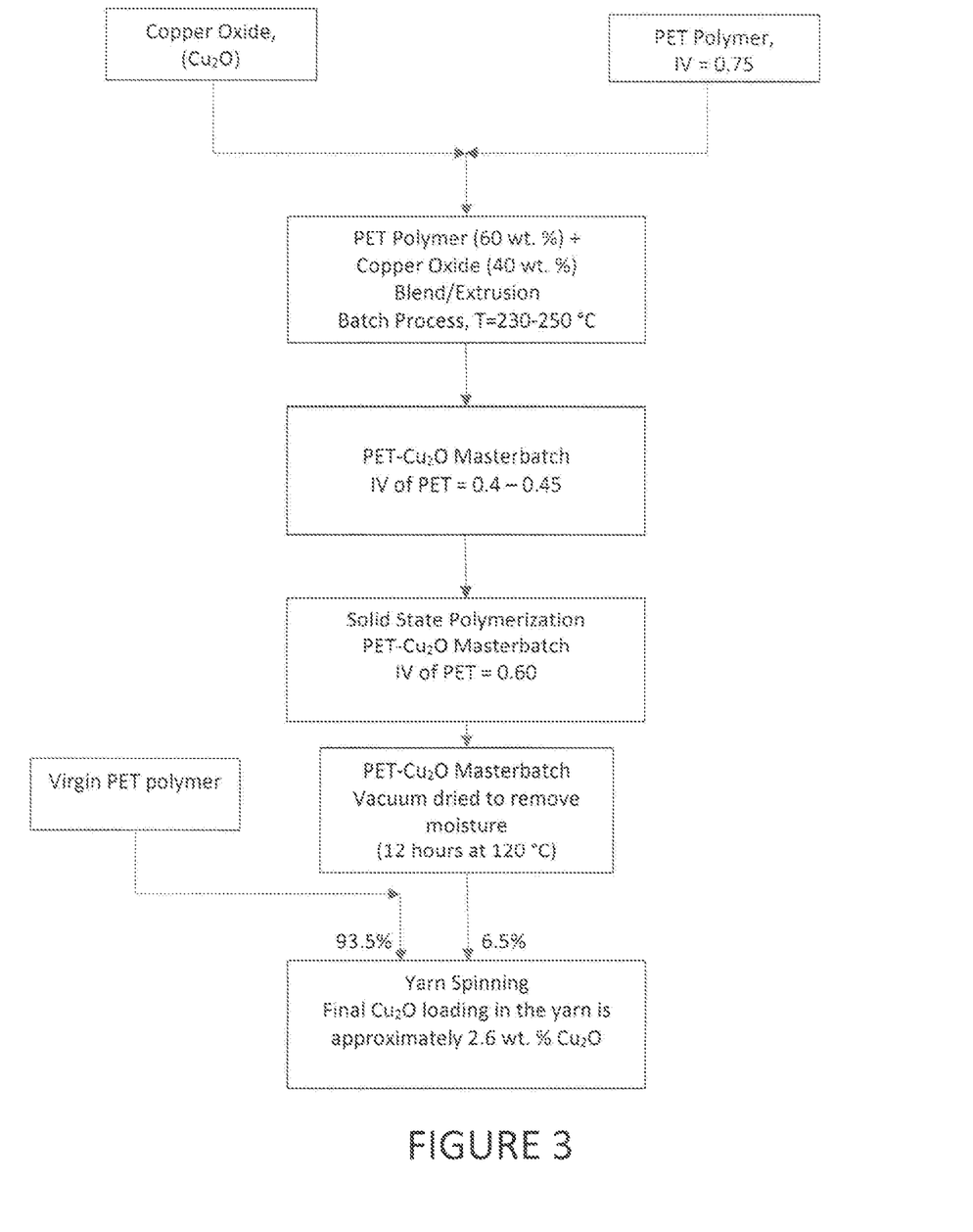

An embodiment of a method of forming an antimicrobial masterbatch is shown in FIG. 3. The antimicrobial masterbatch may be blended with virgin polymers to produce antimicrobial polymeric materials, commercial grade cuprous oxide powder, at 40 wt. %, has been compounded with polyester (PET) as described above. Irgafos® (available from BASF™), a phosphite-stabilizer was used in the masterbatch compounding process to scavenge any moisture in the compounding process. In the embodiment shown in FIG. 3, after compounding, the masterbatch was heated to a temperature above the glass transition temperature and the melting point (solid state polymerization) to increase the IV/molecular weight of the PET and to react the polymer with the hydroxyl groups on the surface of the cuprous oxide particles. The IV of the PET in the masterbatch before heat processing was 0.45 and after the IV increased to 0.65 even after generation of the moisture from the hydroxyl groups on the surface of the antimicrobial particles.

This solid state polymerization-masterbatch was used at a let-down ratio (LDR) of 6.5% to obtain a synthetic yarn with final cuprous oxide loading of 2.6 wt %. Surprisingly, during the extrusion of the yarn, the polymer ran well producing stable thread line without the issues of dripping through the spinneret holes experienced in the previous embodiments. This embodiment of the method of producing an antimicrobial masterbatch resulted in insubstantial loss of IV and only limited degradation of polymer molecular weight due to hydrolysis. The yarn yield by spinning was >80%, a large increase over the prior art.

It was interesting to note that the addition of a solid state polymerization step after the compounding of the polymer with the antimicrobial particles produced a high yield spinning process compared to solid state polymerization of the polymer prior to compounding. The yarn yield increased from <1.0% (pre-Solid state polymerization process and conventional masterbatch processing) to >80% (post compounding solid state polymerization process).

The inventors hypothesized that by solid state polymerization of the masterbatch after compounding would result in the polyester's carboxyl groups reacting with a sufficient amount of the hydroxyl groups on the surface of cuprous oxide particles. The resulting water formed during the reaction between surface hydroxyl groups and carboxyl groups would then be removed during the heat processing by evaporation or limited hydrolysis. Thus removing the potential of water formation by reaction with the hydroxyl groups during subsequent encounter of antimicrobial particles with the virgin polymer chip during blending and extrusion. In one embodiment, the reaction temperature is held for sufficient time to react 75% or more of the hydroxyl groups on the surface of the antimicrobial polymer. In another embodiment, the reaction temperature is held for sufficient time to react with at least 90% or more of the hydroxyl groups on the surface of the antimicrobial polymer.

Furthermore, as described, it has been surprisingly discovered that in an embodiment of the process for producing masterbatch by performing a solid state polymerization process on a polymer compounded with copper oxide or copper iodide in particle form in a polymeric slurry the yield of the process may be greatly improved. After blending the heat processed antimicrobial masterbatch with a virgin polymer, the polymer may be extruded into fibers, yarns or sheets at high yields wherein the fibers, yarns or sheets will possess antimicrobial, antifungal and antiviral properties.

The yarns or fibers may be incorporated into various product. For example, the fiber or yarns may be incorporated into textile. As used herein, the term "textile" includes fibers, whether natural (for example, cotton, silk, wool, and linen) or synthetic yarns spun from those fibers, and woven, knit, and non-woven fabrics made of those yarns. The scope of said invention includes all natural fibers and all synthetic fibers used in textile applications, including but not limited to synthetic cellulosic fibers (i.e., regenerated cellulose fibers such as rayon, and cellulose derivative fibers such as acetate fibers), regenerated protein fibers, acrylic fibers, polyolefin fibers, polyurethane fibers, and vinyl fibers, and blends thereof.

Embodiments of the method may produce polymeric materials incorporating insoluble copper oxide particles that release Cu+ and/or Cu++ are incorporated herein having antimicrobial and antiviral properties.

In addition, the masterbatch may be blended with other polymers to enhance extrusions of fiber, injection molded products, extrusions of film, or a plastic sheets and which are easy to prepare and have antimicrobial and/or antiviral properties.

Suitable thermoplastic resins incorporating antimicrobial masterbatch, fire retardant masterbatch, and other additives include, but are not limited to, polyamides such as nylon 6 or nylon 6.6, polyvinyl chloride and copolymers of ethylene, base polymer is one of a polyester, polyethylene terephthalate, polybutylene terephthalate, and polytrimethylene terephthalate polylactic add, polyglycolide, and polylactic-co-glycolic acid, polyamides or nylon including, but not limited to, nylon-6 (polycaprolactum), Nylon 6.6, polyurethanes, thermoplastic polymers or copolymers, polyethylene, polypropylene, polyalkanes, polystyrene, polyoxymethylene polyacrylates, polymethacrylates, polyether sulfones, polysulfones, polyether ketones, polyolefin, polystyrene copolymers, acrylonitrile-butadiene-styrene terpolymers, a polyurethane, polytetrafluoroethylene, polyvinyl chloride, an acrylic, polybutylene, polylactic acid and combinations thereof. The thermoplastic resin to be blended with the antimicrobial masterbatch and the masterbatch polymer may be the same polymer or they may be different polymers.

In some embodiments, an antimicrobial polymeric masterbatch for preparing an antimicrobial and antiviral polymeric materials comprises an antimicrobial and antifungal and antiviral agent consisting essentially of water insoluble particles of ionic copper compounds, in preferred embodiments of the antimicrobial masterbatch comprises between about 4 wt. % and 83 wt. % of a thermoplastic resin, about 10 wt. % to 60 wt. % of antimicrobial particles, such as, but not limited to, water insoluble particles of ionic copper compounds.

In one embodiment, the antimicrobial particle comprises the ionic copper compounds comprising a mixture of $CuO$ and $Cu_2O$.

In especially preferred embodiments of the present invention said particles are of a size of between a 2 to 20 microns. Preferably said particles are present in the final product after blending of the masterbatch with virgin polymer in an amount of between 0.25 and 5 wt. % of the polymer.

The antimicrobial masterbatch could also be used a process to produce antimicrobial nonwoven materials. Typically, nonwoven materials include polymeric sheet or web structures comprising polymeric filaments or fiber bonded together by entangling or thermally bonding the fibers or filaments. The nonwoven materials may, typically, be flat, porous sheets that are made directly from separate fibers, molten plastic, or plastic film.

Nonwoven materials may be prepared from melted polymer chips. The melted polymer may be a combination of the antimicrobial masterbatch and a virgin polymer that is blended together. The molten polymer may then be spun to form filaments and, optionally, stretched. The filaments may be bid on a conveyor to form a web of filaments that are thermally bonded into a sheet. The sheet may be further embossed between heated rollers to form the nonwoven fabric.

The high yield of a spinning process using masterbatch produced by the heating process described herein results in a polymer with sufficient viscosity to be spun into a nonwoven and have antimicrobial properties or fire retardant properties.

In another embodiment, antimicrobial nonwoven material comprise filaments of fibers that are bonded together, wherein the filaments or fibers comprise antimicrobial particles or fire retardant particles. In the nonwoven material, a portion of the antimicrobial particles are exposed and protruding from surfaces of the polymeric filaments or fibers and release at least one of antimicrobial ions upon contact with a fluid. For example, antimicrobial nonwoven may comprise water-insoluble copper compound particles, wherein a portion of the water-insoluble copper compound particles are exposed and protruding from surfaces of the polymeric material and the water-insoluble copper oxide particles release at least one of $Cu+$ ions and $Cu++$ ions upon contact with a fluid.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

The invention claimed is:

1. A method of producing an antimicrobial masterbatch, comprising:
compounding antimicrobial particles with a base polymer wherein the ratio of antimicrobial particles to base polymer is between 1 to 7 and 1 to 1 to produce an antimicrobial polymer, wherein the antimicrobial polymer comprises antimicrobial particles in a concentration from 12 wt. % to 50 wt. %;
adding a water scavenger during the compounding of the antimicrobial particles with the base polymer, wherein the compounding includes blending the antimicrobial particles, the base polymer, and the water scavenger to produce a polymer blend and extruding the polymer blend; and
after compounding, heating the polymer blend to react the polymer in the masterbatch with hydroxyl groups attached to the antimicrobial particles to a reaction temperature between the glass transition temperature and the melting temperature of the base polymer to produce an antimicrobial masterbatch.

2. The method of claim 1, wherein the heating results in an increase in the intrinsic viscosity of the polymer in the antimicrobial polymer.

3. The method of claim 1, wherein the reaction temperature is from 100° C. below the melting temperature to the melting temperature of the polymer in the antimicrobial polymer.

4. The method of claim 1, wherein the reaction temperature is from 100° C. below the melting temperature to a temperature 10° C. below the melting temperature of the polymer in the antimicrobial polymer.

5. The method of claim 1, wherein the reaction temperature is from 60° C. below the melting temperature to a temperature 20° C. below the melting temperature of the polymer in the antimicrobial polymer.

6. The method of claim 1, comprising:
blending the antimicrobial masterbatch with a thermoplastic polymer at a let-down ratio between 3% and 10% to produce an antimicrobial polymer.

7. The method of claim 6, wherein the thermoplastic polymer is the same polymer as the base polymer.

8. The method of claim 6, wherein the thermoplastic polymer is a different polymer than the base polymer.

9. The method of claim 6, comprising:
blending the antimicrobial masterbatch with a thermoplastic polymer at a let-down ratio between 5.5% and 7.5% to produce an antimicrobial polymer.

10. The method of claim 6, wherein the antimicrobial polymer comprises antimicrobial particles in the range from 1.5 wt. % to 4 wt. % of antimicrobial particles.

11. The method of claim 10, comprising extruding the antimicrobial polymer to produce an antimicrobial fiber.

12. The method of claim 11, wherein the yield of extruding the antimicrobial polymer is greater than 80%, wherein yield is calculated by the weight of the antimicrobial fiber produced divided by the weight of the antimicrobial polymer that was extruded.

13. The method of claim 1, wherein the base polymer is one of a polyester, polyethylene terephthalate, polybutylene terephthalate, and polytrimethylene terephthalate, polylactic acid, polyglycolide, and polylactic-co-glycolic acid, polyamides or nylon including, but not limited to, nylon-6 (polycaprolactum) and Nylon 66, polyurethanes, a thermoplastic polymer or copolymer, and combinations thereof.

14. The method of claim 13, wherein the base polymer has an intrinsic viscosity between 0.6 and 0.85.

15. The method of claim 1, wherein the base polymer is polyethylene terephthalate.

16. The method of claim 1, wherein the water scavenger is a phosphite.

17. The method of claim 1, wherein after compounding, the intrinsic viscosity of the polymer in the antimicrobial polymer is reduced to between 0.35 and 0.5.

18. The method of claim 1, wherein after compounding, the intrinsic viscosity of the polymer in the antimicrobial polymer is reduced to between 0.4 to 0.5.

19. The method of claim 1, wherein the intrinsic viscosity of the polyester polymer increases into a range from 0.6 to 0.85.

20. The method of claim 1, wherein the intrinsic viscosity of the polyester polymer increases into a range from 0.6 to 0.7.

21. A method of forming an antimicrobial fiber, comprising:
compounding water-insoluble copper compound particles with a polyester polymer wherein the ratio of antimicrobial metal particles to polyester polymer is between 1 to 7 and 1 to 1 to produce an antimicrobial polyester, wherein the water-insoluble copper compound particles have hydroxyl groups attached to a surface of the insoluble copper compound particles and the compounding includes blending the water-insoluble copper compound particles and the polyester polymer to produce a polymer blend;
after compounding, heating the polymer blend to react the polyester polymer in the antimicrobial polymer with the hydroxyl groups attached to the surface of the insoluble copper compound particles to a reaction temperature between the glass transition temperature and the melting temperature of the polyester polymer in the antimicrobial polymer and polymerize the polyester polymer in the polymer blend to produce an antimicrobial masterbatch;
blending the antimicrobial masterbatch with a thermoplastic polymer to produce an antimicrobial polymer; and
extruding the antimicrobial polymer to produce an antimicrobial fiber, wherein a portion of the water-insoluble copper compound particles are exposed and protruding from surfaces of the polymeric material, wherein the water-insoluble copper oxide particles release at least one of Cu+ ions and Cu++ ions upon contact with a fluid.

22. The method of claim 21, wherein the reaction temperature is from 100° C. below the melting temperature to a temperature 10° C. below the melting temperature of the polymer in the antimicrobial polymer.

23. The method of claim 21, wherein the reaction temperature is from 60° C. below the melting temperature to a temperature 20° C. below the melting temperature of the polymer in the antimicrobial polymer.

* * * * *